United States Patent [19]
Jornod

[11] 3,792,366
[45] Feb. 12, 1974

[54] METHOD AND APPARATUS PROVIDING INDEPENDENT ADJUSTMENTS AND COMPENSATIONS IN CONDITION SENSITIVE MEASURING OR CONTROLLING CIRCUITS

[75] Inventor: Eugene R. Jornod, Rockford, Ill.

[73] Assignee: Barber-Colman Co., Rockford, Ill.

[22] Filed: Sept. 13, 1972

[21] Appl. No.: 288,657

[52] U.S. Cl. ........................... 330/22, 24, 96, 143
[51] Int. Cl. ...................................... H03f 3/68
[58] Field of Search ............... 330/9, 22, 30, 199

[56] References Cited
UNITED STATES PATENTS
3,413,561  11/1968  Hogan .......................... 330/9
2,801,296  7/1957   Blecher ......................... 330/9

*Primary Examiner*—Nathan Kaufman
*Attorney, Agent, or Firm*—A. Richard Koch

[57] ABSTRACT

Potentials, produced by independent half-bridges, are algebraically summed in various proportions with a condition sensitive millivolt potential to provide an input to an amplifier producing an output potential as a function of the summed input potential.

10 Claims, 1 Drawing Figure

3,792,366

METHOD AND APPARATUS PROVIDING INDEPENDENT ADJUSTMENTS AND COMPENSATIONS IN CONDITION SENSITIVE MEASURING OR CONTROLLING CIRCUITS

BACKGROUND OF THE INVENTION

This invention is concerned with electrical circuits for use in condition sensitive measuring or controlling apparatus and primarily with non-interacting compensations and adjustments, for such as ambient temperature, span and zero offset.

The use of operational amplifiers as voltage summers is well-known in the art, as are measuring and controlling circuits providing ambient temperature compensation, and span and zero offset adjustments. In the past, however, changing the span would change the zero offset or affect the accuracy of the ambient temperature compensation and a change in zero offset would change the span or affect the accuracy of the ambient temperature compensation. When thermocouples, strain gages and the like, producing millivolt outputs, where used as condition sensors, extremely accurate components were required for compensation and making adjustments. This made the circuits difficult to adjust and compensate accurately and increased the cost of the components.

SUMMARY OF THE INVENTION

This invention discloses a method and apparatus employing a plurality of half-bridges to produce independent signals to provide various compensating and adjusting features for a condition sensitive measuring or controlling circuit. The signals from the half-bridges are summed with a condition sensitive signal to provide a condition sensitive output signal, compensated and adjusted to meet prescribed requirements. Provision is made for weighting the affect of the various input signals on the summed signal, thus permitting use of less accurate components.

DESCRIPTION OF THE PREFERRED EMBODIMENTS

Figure 1:
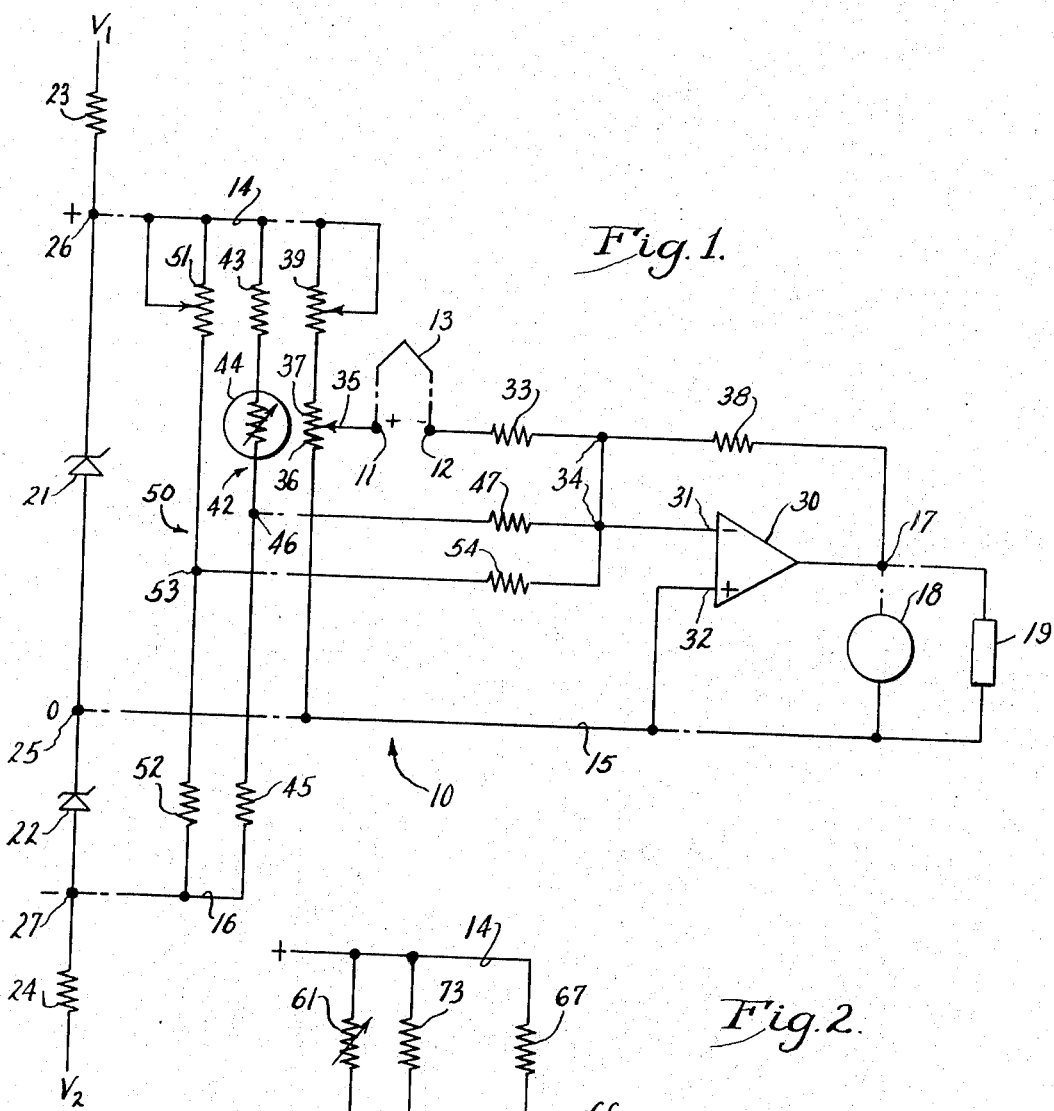
FIG. 1 is a schematic circuit diagram of a preferred embodiment of this invention with connections to external circuitry shown in dashed lines.

In FIG. 1, the invention is disclosed as a circuit 10, connectable at sensor terminals 11, 12 to a source of condition sensitive millivolt potential, shown as a thermocouple junction 13. Conductors 14, 15, 16 are connectable to external sources of potential, as described later. The output terminal 17 may be connected to a meter 18, a load 19, or both, as required.

As shown, the external sources of constant potential are derived from a direct current supply between sources $V_1$ and $V_2$. A pair of Zener diodes 21, 22 are connected in series between voltage dropping resistors 23, 24 respectively connected to the DC sources $V_1$, $V_2$. The reference point 25, shown as 0 at the junction between the diodes, is connected to conductor 15. The regulated positive DC potential point 26, shown as + with respect to the reference point, is between diode 21 and resistor 23 and is connected to conductor 14. The regulated negative DC potential point 27, shown as − with respect to the reference point, is between diode 22 and resistor 24 and is connected to conductor 16. The magnitudes of the DC potentials at positive point 26 and negative point 27 may or may not be equal with respect to reference point 25, but they must be of opposite polarity with respect to the reference point. Any other source of DC potential producing similar results could be substituted for that shown.

An operational amplifier 30 had an inverting input terminal 31, a non-inverting input terminal 32, and an output terminal, which is the same as output terminal 17. The non-inverting terminal 32 is joined to the reference conductor 15. The sensor terminal 12 is connected through a scaling resistor 33 and a summing junction 34 to inverting terminal 31. Sensor terminal 11 is connected through an adjustable tap 35 and a setpoint determining resistance 36, constituting that portion of a voltage divider 37 below tap 35, to reference conductor 15. A negative feedback resistor 38 connects the output terminal 17 to summing junction 34, so that, with thermocouple 13 connected between sensor terminals 11, 12, an output signal is obtained at output terminal 17 proportional to the temperature sensitive potential generated by the thermocouple junction.

When the voltage divider 37 is connected to positive conductor 14, as through a resistance 39, current flows from conductor 14 through resistance 39 and voltage divider 37 to reference conductor 15, thus providing a positive selectable setpoint bias potential at tap 35. With the positive thermocouple wire, shown as +, connected to terminal 11 and the negative thermocouple wire, shown as −, connected to terminal 12, the bias and thermocouple potentials will be opposed so that only the error potential, representing the difference between the setpoint and sensed temperatures, is impressed between the input terminals 31, 32 and the output potential at output terminal 17 will be proportional to this difference in temperature. Since the temperature setpoint is dependent upon the potential across the adjustable resistance 36, it will be apparent that, by inserting resistance 39 between the voltage divider 37 and conductor 14, the maximum potential available at adjustable tap 35 may be limited, reducing the span of setpoint temperatures available. The span may be adjusted by substituting different values of resistance at 39 or by making resistance 39 adjustable, as shown. The position of tap 35 on voltage divider 37 then determines the setpoint as a selectable portion of the predetermined available span of temperatures. The voltage divider 37 is usually a potentiometer, the sliding contact being the tap 35.

Compensation for ambient temperature is provided by a half-bridge 42 comprising a fixed resistor 43, a positive temperature coefficient resistive element 44 and a fixed resistor 45 connected in series between conductors 14, 16 and with a junction 46 between element 44 and resistor 45 connected through a scaling resistor 47 to summing junction 34. As the ambient temperature increases, the resistance of element 44 also increases, lowering the potential at the junction 46 to be summed at junction 34. By proper choice of fixed resistors 43, 45 and element 44, the potential at junction 46 may be made to decrease or increase from the reference potential in proportion to the increase or decrease respectively of the ambient temperature from a predetermined temperature. By proper selection of scaling resistor 47, the affect of this ambient temperature compensating bias potential may be reduced to match the characteristic of the thermocouple junction. It will be obvious that a negative temperature coefficient resistive element inserted between fixed resistor 45 and junction 46 and with the positive temperature coefficient element 44 removed would produce the same result.

When it is desired that the output potential be offset from zero, that is, to vary about some fixed potential other than zero in proportion to the deviation of sensed temperature from setpoint, another compensating half-bridge 50 is used. It comprises an adjustable resistance 51 and a fixed resistor 52 in series between the conductors 14, 16 and produces at junction 53 an adjustable zero offset bias potential dependent upon the value of resistance 51. This half-bridge is merely an adjustable resistive voltage divider. The junction 53 is connected to summing junction 34 through a scaling resistor 54. Once again the effect of the zero offset potential at summing point 34 may be reduced by proper selection of scaling resistor 54. Since the zero offset potential is established in a separate half-bridge 50 and is merely summed with other potentials at summing junction 34, the zero offset may be set independent of any other adjustments or compensations.

Since the various adjustments, for span, zero offset and the like, are made in independent half-bridges, they may be made in any order. According to operational amplifier theory, the algebraic sum of the currents entering or leaving summing junction 34 through scaling resistors 33, 47, 54 and feedback resistor 38 must be zero, providing at output terminal 17 an output potential proportional to the algebraic sum of the currents through the scaling resistors.

Figure 2:
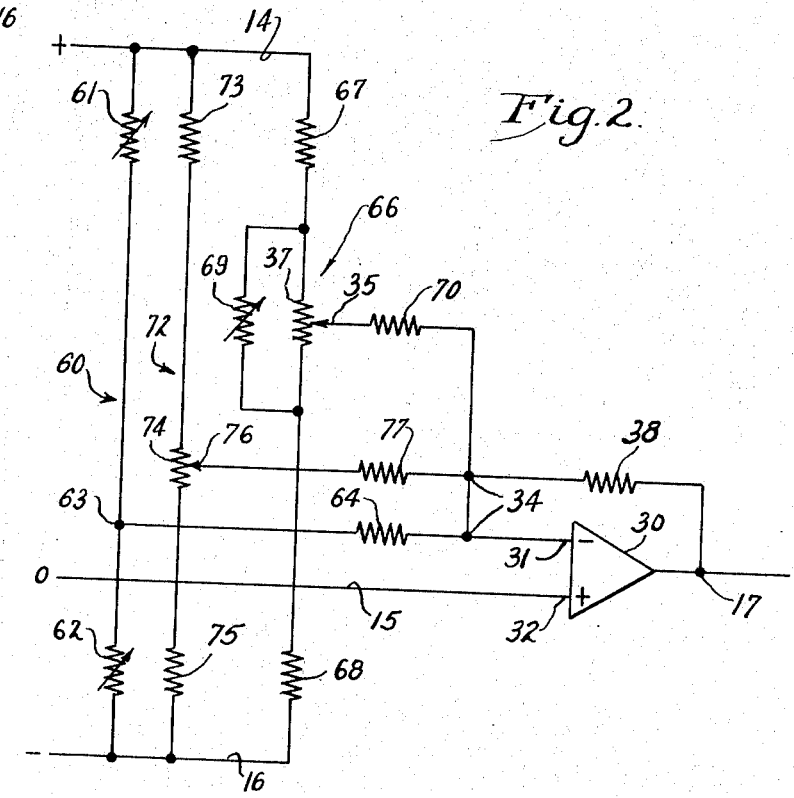
FIG. 2 is a schematic circuit diagram of another embodiment of the invention.

In FIG. 2 a number of modifications are shown. These are representitive of modifications that may be made singly or in combination in the circuit shown in FIG. 1. Where the same components have been employed, they have been identified by the same reference numerals.

The sensor 60 is shown as a half-bridge made up of complementary resistive strain sensing elements 61, 62, producing at their junction 63 a condition responsive potential varying from the reference potential on conductor 15 in amplitude and polarity in proportion to the deviation and sense of the departure of the sensed strain from a predetermined value. Junction 63 is connected to summing junction 34 through the scaling resistor 64.

A separate span and setpoint compensating half-bridge 66 is shown as comprising a fixed resistor 67, setpoint potentiometer 37 and fixed resistor 68 connected in series between conductors 14, 16 with a variable span determining resistance 69 shunting the potentiometer. The selected value of resistance 69 establishes a predetermined fixed potential across potentiometer 37 to determine the span of setpoints available. The selected position of sliding contact 35 on potentiometer determines the setpoint as a percent of span. The contact 35 is connected to summing junction 34 through scaling resistor 70. The setpoint potential at contact 35 may vary from the reference potential on conductor 15 in either direction, but must balance the affect of sensor potential upon the summing junction, when the sensed and setpoint temperatures are equal.

The zero offset compensating half-bridge 72 is shown as comprising a fixed resistor 73, a potentiometer 74 and another fixed resistor 75 in series between conductors 14, 16. The position of a sliding contact 76 on potentiometer 74 determines the zero offset potential. The sliding contact is connected to summing junction 34 through a scaling resistor 77.

The embodiments shown and described are merely exemplary and do not limit the scope of the invention, which is defined solely by the claims. It will be obvious that the condition sensitive millivolt potential could be compensated for humidity, radiant energy reception or any other ambient condition instead of, or in addition to, temperature. Any appropriate feedback network could be substituted for the feedback resistor to produce an output potential as a predetermined function of the summed potentials.

I claim:

1. A circuit adapted to provide a variable output in response to a source of condition sensitive millivolt potential and adapted to receive power from first and second sources of constant potential and of opposite polarity with respect to a reference potential, said circuit comprising an amplifier, an inverting terminal, a non-inverting terminal and an output terminal on said amplifier; a summing point at the inverting terminal, said non-inverting terminal for connection to the source of reference potential, a first scaling resistor for connection in series with said source of condition sensitive millivolt potential between the summing point and the non-inverting terminal, a feedback network connected between the output terminal and said summing point, a first conductor for connection to said first source of constant potential, a second conductor for connection to said second source of constant potential, means connected between the conductors for providing a bias potential, and a second scaling resistor connected to deliver said bias potential to the summing point, whereby said bias potential is summed with the condition sensitive millivolt potential in proportion to the values of the respective scaling resistors and amplified to produce an output potential at the output terminal.

2. A circuit according to claim 1 wherein said means providing a bias potential comprises an ambient condition sensitive resistance.

3. A circuit according to claim 1 wherein said means providing a bias potential comprises a zero offsetting selectable resistance.

4. A circuit according to claim 1 wherein said means providing a bias potential comprises a setpoint determining voltage divider.

5. A circuit according to claim 4 further comprising means for limiting the potential across said setpoint determining voltage divider to determine the span of available setpoints.

6. A circuit according to claim 1 additionally comprising a voltage divider connected between one of said conductors and the non-inverting terminal, a selectable tap on said voltage divider, and a third scaling resistor connected between the tap and the summing point.

7. A circuit according to claim 1 additionally comprising a voltage divider connected between one of said conductors and the non-inverting terminal, a setpoint determining selectable tap on said voltage divider, a portion of said voltage divider between the tap and the non-inverting terminal connectable in series with said source of condition sensitive millivolt potential to provide an opposing setpoint potential.

8. A circuit according to claim 7 further comprising means for limiting the potential across said voltage divider to determine the span of available setpoints.

9. A circuit according to claim 8 additionally comprising an ambient condition sensitive half-bridge between said conductors and providing an ambient compensating bias potential at a compensatory junction, and a third scaling resistor connecting said compensatory junction to the summing junction.

10. A circuit according to claim 9 additionally comprising a zero offset half-bridge between said conductors and providing a zero offset bias potential at an offset junction, and a fourth scaling resistor connecting said offset junction to the summing junction.

* * * * *